(12) United States Patent
Kratz et al.

(10) Patent No.: US 12,148,306 B2
(45) Date of Patent: Nov. 19, 2024

(54) AUTONOMOUS VEHICLE INTERACTION SYSTEM

(71) Applicant: HARMAN INTERNATIONAL INDUSTRIES, INCORPORATED, Stamford, CT (US)

(72) Inventors: Sven Kratz, Mercer Island, WA (US); Joseph Verbeke, San Francisco, CA (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 285 days.

(21) Appl. No.: 17/625,304

(22) PCT Filed: Aug. 9, 2019

(86) PCT No.: PCT/US2019/046045
§ 371 (c)(1),
(2) Date: Jan. 6, 2022

(87) PCT Pub. No.: WO2021/029860
PCT Pub. Date: Feb. 18, 2021

(65) Prior Publication Data
US 2022/0250657 A1 Aug. 11, 2022

(51) Int. Cl.
*G08G 1/00* (2006.01)
*B60Q 1/24* (2006.01)
(Continued)

(52) U.S. Cl.
CPC ............ *G08G 1/202* (2013.01); *B60Q 1/247* (2022.05); *B60Q 1/5037* (2022.05); *B60Q 1/507* (2022.05);
(Continued)

(58) Field of Classification Search
CPC .......... G08G 1/202; G08G 1/13; B60Q 1/247; B60Q 1/5037; B60Q 1/507; B60Q 1/543;
(Continued)

(56) References Cited

U.S. PATENT DOCUMENTS 9,481,287 B2    11/2016 Marti et al.
11,378,413 B1*  7/2022 Rao ..................... G01C 21/3605
(Continued)

FOREIGN PATENT DOCUMENTS

CN      109927624 A    6/2019
WO      2017/079222 A1  5/2017
(Continued)

OTHER PUBLICATIONS

International Search Report and Written Opinion, 13 pages, Nov. 4, 2019.

*Primary Examiner* — Navid Z. Mehdizadeh
*Assistant Examiner* — Shelley Marie Osterhout
(74) *Attorney, Agent, or Firm* — Artegis Law Group, LLP (57) ABSTRACT

A system for interacting with an autonomous vehicle includes a sensor included in the autonomous vehicle and configured to generate sensor data corresponding to a projected hailing area; a projection system included in the autonomous vehicle and configured to generate the projected hailing area on a surface proximate the autonomous vehicle; and a processor included in the autonomous vehicle and configured to execute instructions to: analyze the sensor data to detect the person within the projected hailing area; and in response to detecting the person within the projected hailing area, cause an acknowledgment indicator to be outputted.

18 Claims, 6 Drawing Sheets

(51) Int. Cl.
  *B60Q 1/50* (2006.01)
  *B60W 60/00* (2020.01)
  *G06Q 50/40* (2024.01)
  *G06V 40/20* (2022.01)
  *G10L 15/22* (2006.01)

(52) U.S. Cl.
  CPC ....... *B60Q 1/543* (2022.05); *B60W 60/00253* (2020.02); *G06Q 50/40* (2024.01); *G10L 15/22* (2013.01); *B60Q 2400/40* (2013.01); *B60Q 2400/50* (2013.01); *B60W 2556/45* (2020.02); *G06V 40/20* (2022.01); *G10L 2015/223* (2013.01)

(58) Field of Classification Search
  CPC ........... B60Q 2400/40; B60Q 2400/50; B60W 60/00253; B60W 2556/45; G06Q 50/40; G10L 15/22; G10L 2015/223; G06V 40/20
  See application file for complete search history.

(56) References Cited

U.S. PATENT DOCUMENTS

| | | | |
|---|---|---|---|
| 11,584,397 B2* | 2/2023 | Lee | G06T 7/70 |
| 2014/0043173 A1* | 2/2014 | Chen | G08G 1/202 |
| | | | 340/993 |
| 2016/0167648 A1 | 6/2016 | James et al. | |
| 2017/0153714 A1 | 6/2017 | Gao et al. | |
| 2018/0053276 A1* | 2/2018 | Iagnemma | G08G 1/202 |
| 2019/0164344 A1* | 5/2019 | Potter | B60Q 1/507 |
| 2020/0004341 A1* | 1/2020 | Li | H04W 4/40 |
| 2022/0101633 A1* | 3/2022 | Nishiyama | B60W 60/00253 |

FOREIGN PATENT DOCUMENTS

| | | | |
|---|---|---|---|
| WO | WO-2017155740 A1 * | 9/2017 | ............. B60R 25/00 |
| WO | 2018/035374 A1 | 2/2018 | |

* cited by examiner

AUTONOMOUS VEHICLE INTERACTION SYSTEM

CROSS-REFERENCE TO RELATED APPLICATIONS

The present application is a national stage application of the international application titled, "AUTONOMOUS VEHICLE INTERACTION SYSTEM," filed on Aug. 9, 2019 and having application number PCT/US2019/046045. The subject matter of this related application is hereby incorporated herein by reference.

BACKGROUND

Field of the Embodiments

Embodiments of the present disclosure relate generally to autonomous vehicles and, more specifically, to an autonomous vehicle interaction system.

Description of the Related Art

Autonomous vehicles, which are capable of sensing their surroundings and moving with little or no human input, are being developed with the intention of making travel safer and easier. For example, fleets of self-driving cars may soon be employed as automated ride-hailing services.

Self-driving cars generally rely on a variety of sensors to identify appropriate navigation paths, potential obstacles, and relevant signage. For example, technologies commonly incorporated in self-driving cars include radar, LIDAR, sonar, global-positioning system (GPS) based navigation, odometry, and inertial metrology. Being thus equipped, driverless cars are well-suited to detect and avoid pedestrians and other persons in or proximate to roadways and other navigation paths.

Without a driver, however, once a self-driving car arrives at a requested or specifically targeted location, interaction between the self-driving car and outside passengers or pedestrians can be problematic. For example, unless a requesting rider is in possession of a device specifically designed to communicate with the arriving self-driving car, the self-driving car cannot distinguish the requesting rider from other persons in the vicinity.

In light of the above, more effective techniques for interacting with self-driving cars and other autonomous vehicles would be useful.

SUMMARY

The various embodiments set forth a system for interacting with an autonomous vehicle. The system includes a sensor included in the autonomous vehicle and configured to generate sensor data corresponding to a projected hailing area; a projection system included in the autonomous vehicle and configured to generate the projected hailing area on a surface proximate the autonomous vehicle; and a processor included in the autonomous vehicle and configured to execute instructions to: analyze the sensor data to detect the person within the projected hailing area; and in response to detecting the person within the projected hailing area, cause an acknowledgment indicator to be outputted At least one advantage of the disclosed embodiments is that a rider requesting service from an autonomous vehicle can readily discern a location at which to wait for the autonomous vehicle in order to interact with the vehicle. Another advantage is that, when positioned at the location, a rider or other user can communicate directly with the autonomous vehicle easily, intuitively, and without specialized communication equipment, for example by a gesture or verbal utterance. A further advantage is that a rider or other user can receive a visual and/or audible acknowledgment from the autonomous vehicle when the vehicle has detected the rider/user and/or has received a communication from the rider/user.

BRIEF DESCRIPTION OF THE SEVERAL VIEWS OF THE DRAWINGS

So that the manner in which the above recited features of the one or more embodiments can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
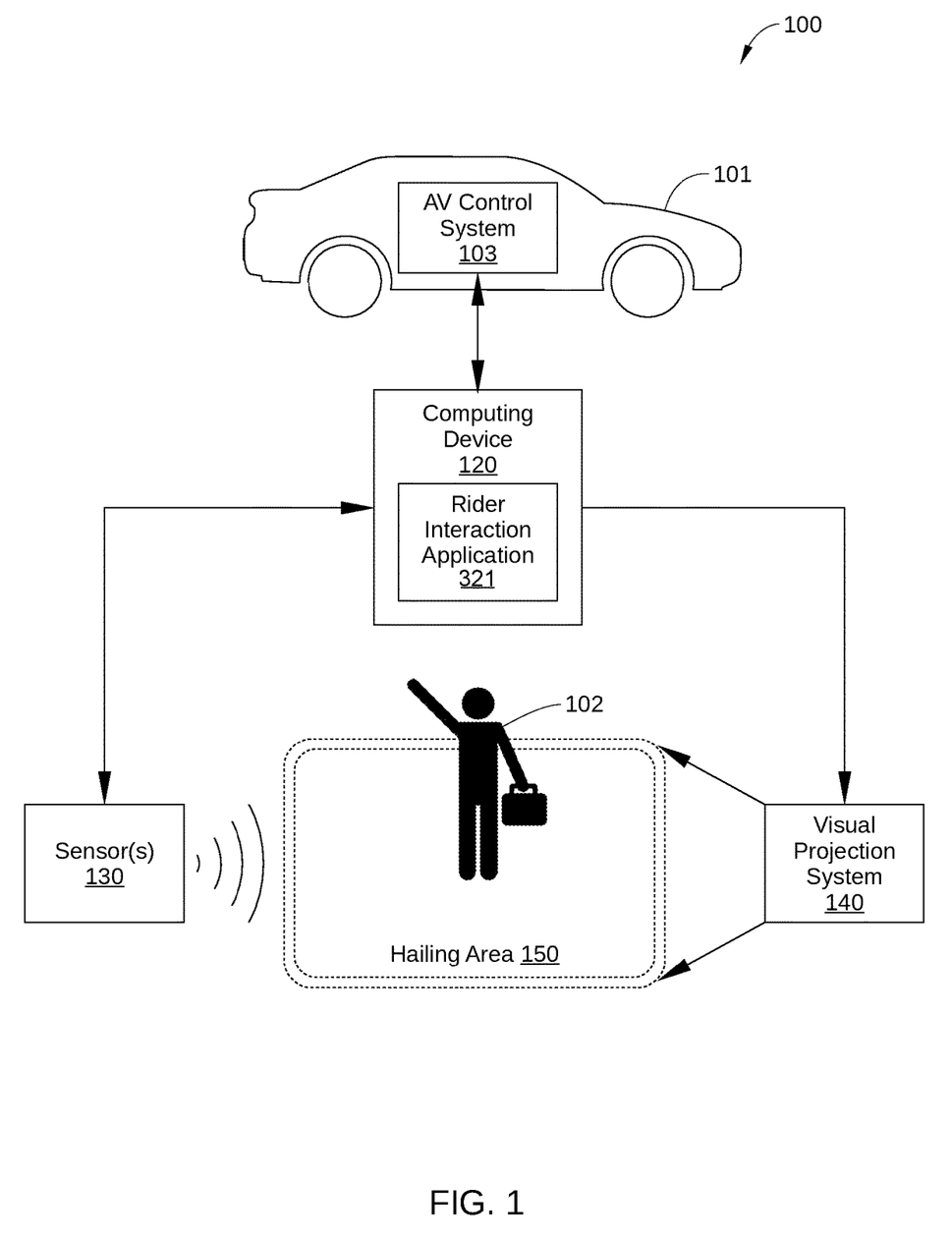
FIG. 1 is a schematic diagram illustrating an autonomous vehicle (AV) interaction system, configured to implement one or more aspects of the present disclosure, according to various embodiments.

FIG. 1 is a schematic diagram illustrating an autonomous vehicle (AV) interaction system 100, configured to implement one or more aspects of the present disclosure, according to various embodiments. AV interaction system 100 enables interactions between an autonomous vehicle 101 and a rider 102 or prospective passenger, without the need for rider 102 to be equipped with any sort of specialized communication device. Such interactions can include, without limitation, AV 101 detecting rider 102, distinguishing rider 102 from other persons in the vicinity of rider 102, determining that a ride request is being performed by rider 102, receiving ride request information from rider 102, and/or generating an acknowledgment indicator that is audible and/or visible to rider 102. Further interactions enabled by AV interaction system 100 include, without limitation, rider 102 generating a ride request via a physical gesture and/or a verbal utterance and rider 102 receiving the acknowledgment indicator from AV 101. The acknowledgment indicator can be generated by AV 101 when AV 101 determines a ride request has been generated by rider 102 and/or when AV 101 detects rider 102.

In operation, AV interaction system 100 causes a hailing area 150 to be projected onto a suitable surface, and, when rider 102 is present within a boundary of hailing area 150, causes a rider detection system to determine when rider 102 generates a ride request. According to various embodiments, hailing area 150 is a region that is explicitly designated for rider-to-AV and/or AV-to-rider interaction. Thus, when a person steps into the temporary "hot spot" indicated by hailing area 150, a suitably configured AV can detect the person and focus optical and/or audio sensors onto the person, for example, in order to listen for voice commands and/or watch for hand or arm gestures. AV interaction system 100 includes, without limitation, a computing device 120, a sensor or sensors 130, and, in some embodiments, a visual projection system 140.

AV 101 can be any computer-operated vehicle, such as an autonomous or self-driving car, truck, watercraft, vertical take-off and landing (VTOL) taxi, drone, and the like. In the embodiment illustrated in FIG. 1, AV 101 is self-driving car, such as an autonomous taxi, that includes an AV control system 103. AV 101 is capable of sensing the surrounding environment, both on and adjacent to the roadway, determining a suitable navigation path through the environment, and moving with little or no human input. As employed herein, a navigation path can include, without limitation, any street, roadway, driveway, parking lot automobile aisle, or other pathway suitable for travel by AV 101. One embodiment of AV 101 is described below in conjunction with FIG. 2.

Figure 2:
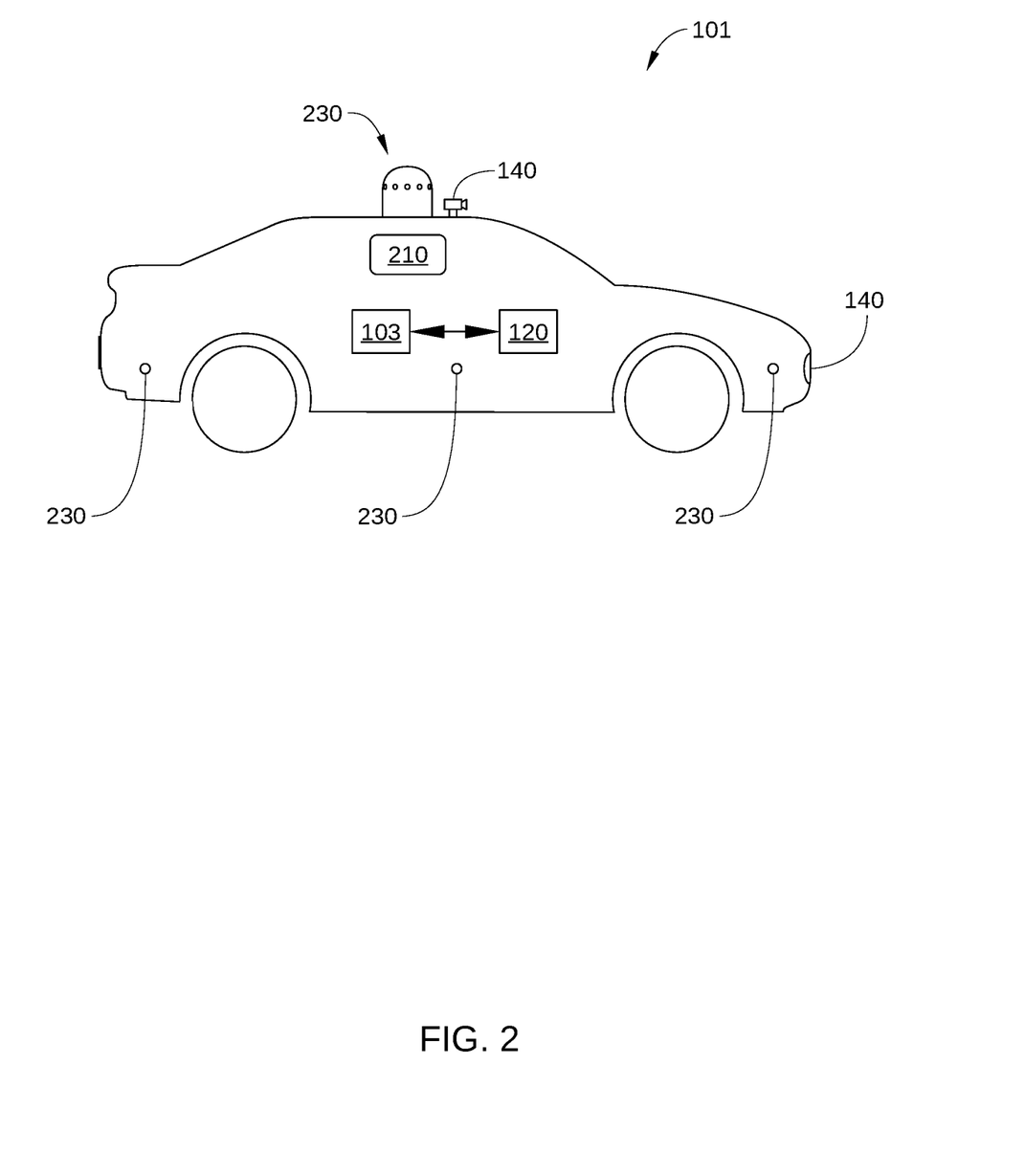
FIG. 2 is a schematic diagram of an AV in the AV interaction system of FIG. 1, according to one or more embodiments of the present disclosure.

FIG. 2 is a schematic diagram of AV 101, according to one or more embodiments of the present disclosure. AV 101 includes, without limitation, AV sensors 230, AV control system 103, and computing device 120. In some embodiments, AV 101 further includes visual projection system 140 and/or an acknowledgment output system 210.

Acknowledgment output system 210 is configured to provide information to a specific rider 102 to acknowledge one or more specific conditions, such as detection of rider 102 within hailing area 150 and/or receipt of a ride request from rider 102. Acknowledgment output system 210 can include, without limitation, one or more output devices to produce such an acknowledgment. For example, acknowledgment output system 210 can include a video screen or other display device for displaying a text-based and/or icon-based message to rider 102, a color-coded light system for indicating a certain status of AV 101, e.g., "occupied," "available," "on-route," "stopping now," and the like. Alternatively or additionally, acknowledgment output system 210 can include an audio output device, such as a directional speaker, that produces an audible acknowledgment to rider 102. For example, a certain sound or audible word(s) can be directed to rider 102 when AV control system 103 detects rider 102 in hailing area 150 and a different sound or audible word(s) can be directed to rider 102 when AV control system 103 receives a ride request from rider 102. Alternatively or additionally, acknowledgment output system 210 can include a haptic output device, such as an ultrasonic transducer, that produces a haptic acknowledgment to rider 102. For example, the ultrasonic transducer can direct an ultrasonic signal onto a surface of rider 102 that is demodulated as a tactile vibration or pressure. Thus, in an embodiment, the ultrasonic transducer can cause rider 102 to experience a certain haptically-induced pressure or sensation, as an acknowledgement indicator, such as a haptic tap on the body. Alternatively, in some embodiments, the haptic output device can include an air puff generator configured to cause rider 102 to experience a haptic tap.

AV sensors 230 can include, without limitation, an array of different sensors configured to measure various properties associated with the environment surrounding AV 101, including, but not limited to, a roadway or navigation path currently occupied by AV 101, and/or areas adjacent to such a roadway or navigation path. AV sensors 230 can include, without limitation, optical sensors (visible light or infrared), acoustic sensors (such as ultrasound sensors, active sonar, and the like), RADAR sensors, LIDAR sensors, depth sensors, stereoscopic imaging sensors, topography mapping sensors, telematic sensors, receivers, and satellite-based navigation systems, and so forth. AV sensors 230 are configured to receive sensor data from a 360° panorama surrounding AV 101 and to transmit the sensor data to AV control system 103 for processing.

AV control system 103 is a computer-based system that is configured to manage the overall operation and navigation of AV 101. AV control system 103 may include any technically feasible type of computer system, although in some embodiments, AV control system 103 can include a computing device similar to computing device 120, which is described in greater detail below in conjunction with FIG. 3. In operation, AV control system 103 is configured to receive sensor data from AV sensors 230 and to process that data to identify a current driving action and navigation path for AV 101. In the context of this disclosure, a "driving action" may include turning, merging, driving through traffic, maintaining speed and lane position, caravanning with other vehicles, navigating to a specified location, and/or other actions associated with the operation of a vehicle. AV control system 103 can also be configured to process the sensor data from AV sensors 230 to identify potentially dangerous driving conditions associated with a driving action that is currently underway. Typically, such driving conditions include the presence, position, and velocity of other road users, such as vehicles, bicycles, scooters, Segways, or pedestrians, whether on the road or a sidewalk proximate the road. Alternatively, in some embodiments, detection of the presence of pedestrians, vehicles, and other potentially dangerous driving conditions can be performed by AV sensors 230. Alternatively, in some embodiments, such functionality can be shared by or divided between AV sensors 230 and AV control system 103.

Returning to FIG. 1, sensors 130 enable interactions between AV 101 and rider 102, and include, without limitation, one or more cameras or microphones that can generate image, video, and/or audio data associated with hailing area 150 and/or a person or persons disposed within hailing area 150. Alternatively or additionally, in some embodiments, sensors 130 include proximity sensors directed toward hailing area 150. In some embodiments, sensors 130 include directional sensors and/or sensors having variable orientation, such as a movable camera or a directional microphone. In such embodiments, as AV 101 approaches an area that includes one or more potential riders 102, the orientation of sensors 130 can be changed, so that image, video, and/or audio data generated by sensors 130 is for a person or persons within hailing area 150 and includes little or no image, video, and/or audio data for a person or persons outside hailing area 150.

In embodiments in which at least a portion of AV interaction system 100 is incorporated in AV 101, sensors 130 are also included in AV 101, for example, incorporated in AV 101, coupled to an exterior surface of AV 101, etc. Additionally, in such embodiments, sensors 130 may include or are coupled to AV sensors 230. Thus, in such embodiments, image, video, and/or audio data generated by sensors 130 can include data already generated by AV sensors 230.

In embodiments in which a portion of AV interaction system 100 is external to AV 101, some of sensors 130 can be included in a fixed structure (not shown in FIG. 1) that is external to AV 101. For example, the fixed structure can be a designated pick-up area for autonomous vehicle riders that includes hailing area 150. In such embodiments, a video camera and/or a microphone included in sensors 103 can be included in the fixed structure, thereby enabling a ride request from rider 102 being communicated to one or more AVs 101 that are not necessarily in the vicinity of hailing area 150.

Visual projection system 140 is an optical projection system configured to direct light onto a suitable surface, such as a portion of sidewalk proximate AV 101, and thus generate hailing area 150. For example, in some embodiments, visual projection system 140 is configured to project an image or images, a geometrical pattern or shape, and/or a series of lines and/or curves onto a portion of sidewalk to generate hailing area 150. In such embodiments, hailing area 150 is produced by the projection of light. Consequently, the geometrical patterns and/or shapes that form hailing area 150 can change location relative to AV 101 and/or be altered in appearance. For example, in such embodiments, some or all portions of hailing area 150 can flash, change color, or include animated portions as part of an acknowledgment indicator that is visible to rider 102 in certain circumstances. In some embodiments, AV control system 103 causes hailing area 150 to be generated proactively, for example to solicit acceptance of a ride from rider 102. In such embodiments, such proactive rider acquisition can include the generation of hailing area 150 around a prospective rider 150 and the attempt to detect certain verbal utterances or physical gestures indicating acceptance or denial of the proffered ride.

Visual projection system 140 can include, without limitation a laser projection system, a liquid crystal display (LCD) projector, a three-dimensional (3D) capable projector, a video projector, or any other technically feasible system capable of projecting images onto a surface, such as a portion of sidewalk. In some embodiments, visual projection system 140 is configured to employ projection mapping to project images on such surfaces, and includes one or more depth sensors for sensing the area on which to project images. Further, in such embodiments, visual projection system 140 is configured to project images that compensate for detected irregularities of the projection surface. Thus, in such embodiments, corrected images are projected on the projection surface by visual projection system 140 that compensate for an irregular shape (curved, slanted, etc.) of the projection surface and/or for the presence of obstructions or other objects (benches, trash cans, rocks, etc.) on the projection surface. In this way, projection of, for example a horizontal square, is modified so that rider 102 is presented with a corrected image that approximates in appear the original image to be projected despite the irregular shape of or presence of obstructions on the surface.

Computing device 120 can be any computational platform configured to execute instructions for the operation of AV interaction system 100, interaction sensor 130, and visual projection system 140, as described herein. One embodiment of computing device 120 is described below in conjunction with FIG. 3.

Figure 3:
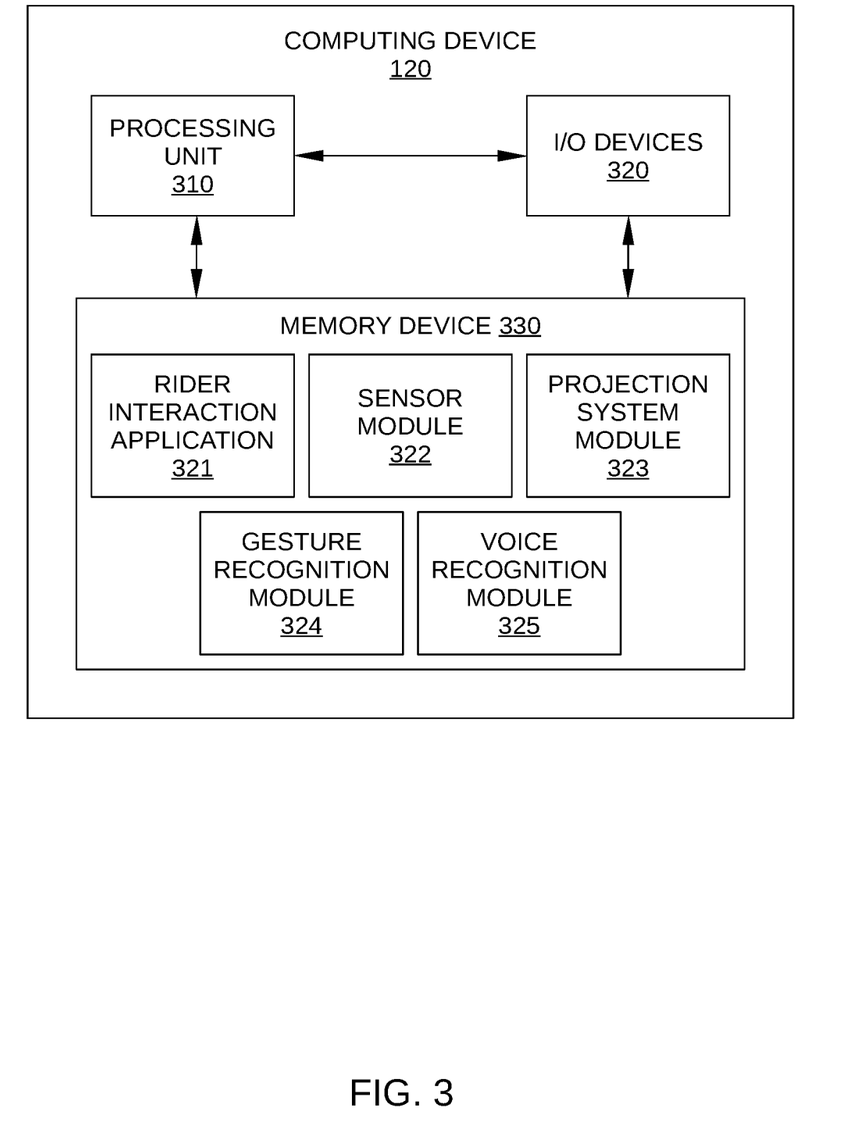
FIG. 3 is a conceptual block diagram of a computing device in the AV interaction system of FIG. 1, according to an embodiment of the present disclosure.

FIG. 3 is a conceptual block diagram of computing device 120, according to an embodiment of the present disclosure. Computing device 120 is configured to implement at least one aspect of the present disclosure described herein. Computing device 120 may be any type of device capable of executing application programs including, without limitation, instructions associated with a rider interaction application 321, a sensor module 322, a projection system module 323, a gesture recognition module 324, and/or a voice recognition module 325. For example, and without limitation, computing device 120 may be an electronic tablet, a smartphone, a laptop computer, etc. Alternatively, computing device 120 may be implemented as a stand-alone chip, such as a microprocessor, or as part of a more comprehensive solution that is implemented as an application-specific integrated circuit (ASIC), a system-on-a-chip (SoC), and so forth. Generally, computing device 120 is configured to coordinate the overall operation of AV interaction system 100. As shown, computing device 120 includes, without limitation, a processing unit 310, input/output (I/O) devices 320, and a memory device 330.

Processing unit 310 may be implemented as a central processing unit (CPU), a graphics processing unit (GPU), an ASIC, a field programmable gate array (FPGA), any other type of processing unit, or a combination of different processing units. In general, processing unit 310 may be any technically feasible hardware unit capable of processing data and/or executing software applications to facilitate operation of AV interaction system 100 of FIG. 1, as described herein. Processing unit 310 may be physically embedded in computing device 120, may be part of a cloud-based computing environment, and/or may be part of a computing device external to AV interaction system 100, such as a mobile computing device or a wearable computing device. In some embodiments, processing unit 310 is an element of an in-vehicle infotainment system included in AV 101, or is an element of AV control system 103. Among other things, and without limitation, processing unit 310 may be configured to execute instructions associated with rider interaction application 321, sensor module 322, projection system module 323, gesture recognition module 324, and/or voice recognition module 325.

Rider interaction application 321 is configured to manage the operation of AV interaction system 100. In some embodiments, rider interaction application 321 receives image and/or audio data from sensors 130, interprets such data, and determines whether rider 102 has performed a ride request. For example, in such embodiments, rider interaction application 321 may receive image data from sensors 130 and determine, via gesture recognition module 324, whether rider 102 has executed a gesture indicating a request for a ride from AV 101. Alternatively or additionally, in such embodiments, rider interaction application 321 may receive sound data from sensors 130 and determine, via voice recognition module 325, whether rider 102 has pronounced a verbal utterance indicating a request for a ride from AV 101. In such embodiments, one or more directional microphones included in sensors 130 can provide selective audio data that substantially reduces and/or eliminates verbal utterances pronounced by persons outside of hailing area 150.

In addition, in some embodiments, rider interaction application 321 receives image data from sensors 130, interprets such data, and determines whether rider 102 is located within hailing area 150. Thus, in such embodiments, rider interaction application 321 distinguishes rider 102 from other persons in the vicinity of rider 102, based on rider 102 being disposed within hailing area 150. Alternatively or additionally, in some embodiments, rider interaction application 321 generates an acknowledgment indicator that is audible and/or visible to rider 102. In such embodiments, the acknowledgment indicator can be a visual, audible, and/or haptic acknowledgment generated by acknowledgment output system 210. Alternatively or additionally, in embodiments in which hailing area 150 is a projected hailing area generated by visual projection system 140, the acknowledgment indicator can include a change in the appearance of hailing area 150, such as a change in color, the flashing or animation of certain portions of hailing area 150, etc. In the case of a haptic acknowledgement, an ultrasonic transducer included in acknowledgment output system 210 cause rider 102 to experience a haptic tap or other tactile acknowledgement.

In some embodiments, rider interaction application 321 includes an application programming interface (API) configured to facilitate communication between computing device 120, AV control system 103, and/or a ride-hailing administration entity that is external to AV 101 and AV interaction system 100. For example, the API can enable ride request information received by rider interaction application 321 to be communicated to the ride-hailing administration entity for further distribution to other AVs in the vicinity of hailing area 150.

Sensor module 322 is configured to control operation of sensors 130, including receipt of image and/or audio data. In embodiments in which sensors 130 include one or more directional sensors, such as a movable camera or a directional microphone, sensor module 322 can also be configured to control the current orientation of such directional sensors. Projection system module 323 is configured to control operation of visual projection system 140, including orientation thereof to a suitable surface for hailing area 150. Gesture recognition module 324 is configured to receive image data from sensors 130 and determine, based on such image data, whether rider 102 has performed a physical hand, arm, head, or other gesture that corresponds to a ride request. Examples of recognizable gestures include, without limitation, a hailing gesture, indicating that rider 102 wants a ride, and a wave-off gesture, indicating the rider 102 does not want a ride. The wave-off gesture may be recognized in situations in which AV control system 103 has implicitly or explicitly solicited rider 102, for example when AV control system 103 causes hailing area 150 to be generated proactively. The wave-off gesture may also be recognized in situations in a person inadvertently stands in hailing area 150 despite not wanting a ride. Gesture recognition module 324 is further configured to inform rider interaction application 321 when such a gesture has been detected. Voice recognition module 325 is configured to receive audio data from sensors 130 and determine, based on such image audio data, whether rider 102 has pronounced a verbal utterance that corresponds to a ride request, such as "I would like a ride to downtown," or "I need a ride." Voice recognition module 325 is further configured to inform rider interaction application 321 when such a verbal utterance has been detected and, in some embodiments, additional information included in the ride request, such as destination information.

Memory 330 may include a random access memory (RAM) module, a flash memory unit, or any other type of memory unit or combination thereof, and may include a single memory module or a collection of memory modules. As shown, in some embodiments, some or all of rider interaction application 321, sensor module 322, projection system module 323, gesture recognition module 324, and/or voice recognition module 325 may reside in memory 330 during operation.

I/O devices 320 includes at least one device capable of both receiving input, such as a keyboard, a mouse, a touch-sensitive screen, a microphone and so forth, as well as devices capable of providing output, such as a display screen, loudspeakers (including a loudspeaker associated with a headphone-based system), and the like. The display screen may be incorporated in AV interaction system 100 or may be external to AV interaction system 100, such as a computer monitor, a video display screen, a display apparatus incorporated into a separate hand held device, or any other technically feasible display screen. In some embodiments, I/O devices 320 include one or more of sensors 130 and/or one or more of AV sensors 230.

In the embodiment illustrated in FIG. 3, computing device 120 is shown as a single integrated device. In other embodiments, some or all of the functionality of computing device 120 described herein can be implemented as multiple computing devices, such as a computing device integrated into sensors 130, a computing device integrated into AV control system 103, and/or a computing device integrated into visual projection system 140.

In some embodiments, hailing area 150 is projected onto a fixed location on a projection surface while AV 101 is in motion. In such embodiments, hailing area 150 can remain stationary as AV 101 moves relative thereto. One such embodiment is illustrated in FIGS. 4A-4C.

Figure 4A:
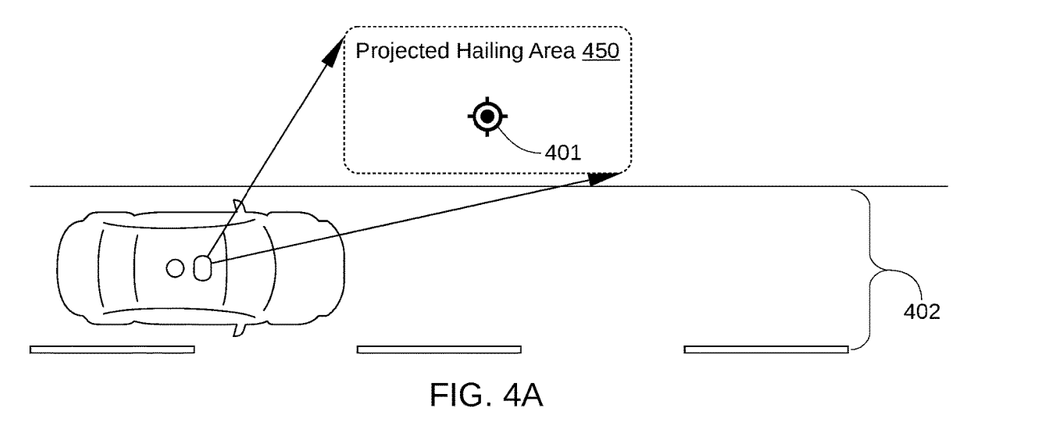
FIGS. 4A-4C schematically illustrate a hailing area generated by an AV-mounted projection system, according to an embodiment of the present disclosure.
Figure 4B:
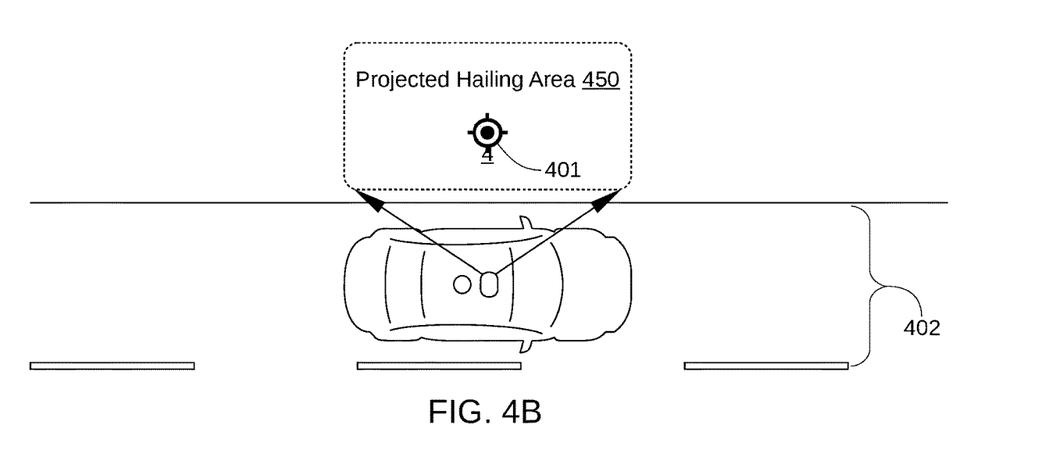
Figure 4C:
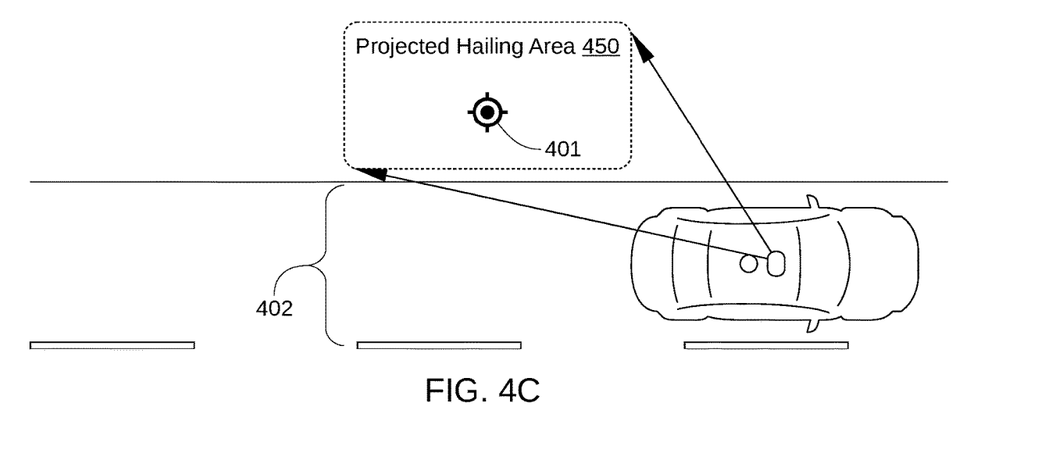

FIGS. 4A-4C schematically illustrate a hailing area 450 generated by an AV-mounted projection system, according to an embodiment of the present disclosure. For example, in some embodiments, hailing area 450 can be projected onto a suitable surface by a roof-mounted projection system and/or by a projection system incorporated into a suitably configured headlight. An example of each such projection system 140 is illustrated in FIG. 2. As shown, when hailing area 450 is projected by an AV-mounted projection system, hailing area 450 can be generated so that hailing area 450 remains stationary, even while AV 101 is in motion. That is, as AV 101 drives along a roadway 402 or other navigation path past a particular location 401 that is disposed adjacent to roadway 402, hailing area 450 is projected from AV 101 so that location 401 is disposed within hailing area 450. In such embodiments, the projection mapping capability of visual projection system 140 enables the projection of stationary hailing area 450.

For example, as AV 101 slowly drives past an area in which multiple potential riders are standing, hailing area 450 is projected to remain substantially stationary relative to the potential riders, and therefore is in motion relative to AV 101. Because hailing area 450 is stationary relative to location 401, any potential rider near location 401 can immediately see hailing area 450. Further, when the potential rider wants to hail AV 101, the potential rider can easily step into hailing area 450, since hailing area 450 is stationary while AV 101 drives past. Typically, AV 101 is traveling at a relatively low speed when in the vicinity of location 401 and, as a result, the potential rider has ample time to step into hailing area 450 before AV 101 has moved on toward a different location for rider pickup.

In some embodiments, location 401 is selected by AV interaction system 100 based on one or more factors. For example, in some embodiments, AV interaction system 100 selects location 401 in response to detecting one or more potential riders 102 proximate location 401. Thus, in one such embodiment, AV interaction system 100 selects location 401 in response to detecting a pedestrian proximate roadway 402 and proactively attempts to acquire a rider 102. In another such embodiment, location 401 is a specific location or category of location, such as a bus stop or airport taxi zone, and AV interaction system 100 selects location 401 in response to rider 102 being present in such a specific location. Alternatively or additionally, in some embodiments, AV interaction system 100 selects location 401 in response to detecting that location 401 corresponds to portion of roadway 402 in which temporary parking, stopping, and/or loading/unloading is permitted. Alternatively or additionally, in some embodiments, AV interaction system 100 selects location 401 in response to receiving instructions specifying that AV 101 proceed to location 401, for example from a ride-hailing administration entity that is external AV 101 and AV interaction system 100. Alternatively or additionally, in some embodiments, AV interaction system 100 selects location 401 in response to receiving a request from a particular rider to meet at or near location 401.

In some embodiments, portions of an AV interaction system are incorporated into a fixed structure that is external to AV 101. For example, in some embodiments, one or more sensors 130 of FIG. 1 and/or projection system 140 of FIG. 1 are incorporated into a fixed structure, such as an AV ride-hailing location. One such embodiment is described below in conjunction with FIG. 5.

Figure 5:
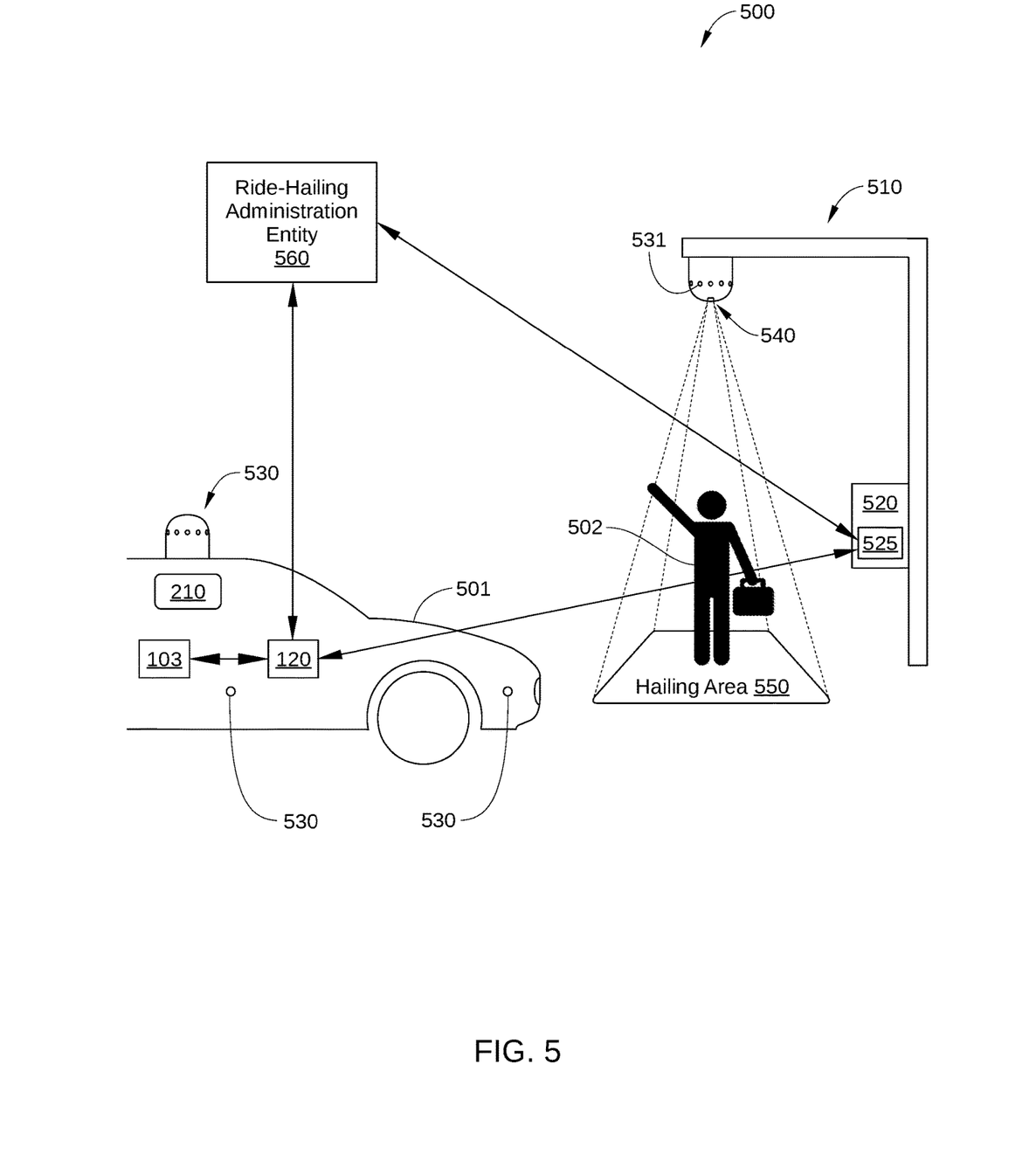
FIG. 5 schematically illustrates an AV interaction system that is distributed between one or more AVs and a fixed structure, according to an embodiment of the present disclosure.

FIG. 5 schematically illustrates an AV interaction system 500 that is distributed between one or more AVs 501 and a fixed structure 510, according to an embodiment of the present disclosure. AV 501 is substantially similar to AV 101 of FIG. 1, except that one or more components of AV interaction system 100 are not included in AV 501, but are instead incorporated into fixed structure 510. In the embodiment illustrated in FIG. 5, AV 501 includes sensors 530, acknowledgment output system 210, AV control system 103 and computing device 120. Fixed structure 510 includes sensors 531, a visual projection system 540, and a computing device 520 that includes or is communicatively coupled to a communication module 525. Fixed structure 510 can be located proximate any suitable roadway or navigation path, such as near the curb side at an airport or train station.

Sensors 530 of AV 501 are configured to enable interactions between AV 501 and a rider 502 located within hailing area 550, such as the detection of gestures by rider 502. As such, sensors 530 can include some or all of the sensors employed by AV 501 for navigation and operation, as well as some or all of the sensors described above for sensors 130 of FIG. 1. For example, in an embodiment, AV 501 employs optical sensors that are already configured for use with AV 501 for navigation to generate image data, and additionally includes one or more microphones for receiving audible input from rider 502 as audio data.

In contrast to sensors 530, sensors 531 are configured to enable interactions between rider 502 and the portion of AV interaction system 500 included in fixed structure 510. Sensors 531 can include one or more cameras or microphones that can generate image, video, and/or audio data associated with hailing area 550 and/or a person or persons disposed within hailing area 550, i.e. rider 502. Thus, sensors 531 enable a person to interact with AV interaction system 500 by stepping within the boundaries of hailing area 550 and performing a specified physical gesture (e.g., a hand or arm signal) or pronouncing a specified verbal utterance (e.g., "I need a ride"). In this way, rider 502 can request a ride from AV 501 and/or from a fleet of AVs, even though no AV is within line of sight of fixed structure 510 or located in the vicinity of fixed structure 510.

Computing device 520 is configured to perform certain functions of AV interaction system 500. Such functions can include, without limitation, detection of a person within hailing area 550, determination that a ride request is performed by the person within hailing area 550, generation of a ride request signal that causes an autonomous vehicle to approach hailing area 550, and/or direction of an indicator output to the person within hailing area 550, such as an audible and/or visible acknowledgment indicator. In some embodiments, computing device 520 is configured to determine a person has performed a ride request based on detecting a gesture from image data generated by sensors 531 and/or on detecting a certain verbal utterance from audio data generated by sensors 531. The audible and/or visible acknowledgment indicator for the person within hailing area 550 can include, without limitation, an alteration in appearance of hailing area 550 or the direction of a certain sound or audible word(s) to rider 502. For example, some or all portions of hailing area 550 can flash, change color, or include animated portions as part of an acknowledgment indicator that is visible to rider 502.

Communication module 525 is configured to enable communications between computing device 520 and computing device 120, via any technically feasible wireless communication system. For example, in some embodiments, communication module 525 is configured to enable direct communication between computing device 520 and computing device 120 via radio waves. Alternatively or additionally, in some embodiments, communication module 525 is configured to enable wireless communication between computing device 520 and computing device 120 via cellular communications. Alternatively or additionally, in some embodiments, communication module 525 is configured to enable communication between computing device 520 and computing device 120 via a ride-hailing administration entity 560 that is external to AV interaction system 500.

In the embodiment illustrated in FIG. 5, computing device 120 is also configured to perform certain functions of AV interaction system 500, but generally not all of the functions described above in conjunction with FIG. 1. For example, in the embodiment illustrated in FIG. 5, computing device 120 is not configured to cause a projection system to generate hailing area 550. Additionally or alternatively, computing device 120 can be configured to receive a ride request signal indicating hailing area 550 as a pickup location. In such embodiments, the ride request signal can be received directly from communication module 525 via wireless communication or from ride-hailing administration entity 560, such as a communication system that is associated with a fleet or multiple fleets of AVs. Furthermore, in some embodiments, computing device 120 is configured to detect rider 502 when approaching hailing area 550, for example via gesture detection and/or face recognition. In such embodiments, computing device 120 can be configured to provide information to a specific rider 502 via output system 210 as an acknowledgment and/or to inform the specific rider 502 that AV 501 is designated for that specific rider 502.

In some embodiments, hailing area 550 is projected temporarily, for example when a rider is within a certain distance of fixed structure 510. Alternatively, hailing area 550 is indicated via a permanent indicator, such as markings delineating the boundaries of hailing area 550, appropriate signage, and/or a continuous projection from projection system 540. In some embodiments, computing device 520 is further configured to generate a first acknowledgment indicator when rider 502 is initially detected within hailing area 550 and a second acknowledgment indicator when a ride request by rider 502 is detected. In such embodiments, the first and second acknowledgment indicators can be audible and/or visible indicators as described above in conjunction with FIG. 1.

Figure 6:
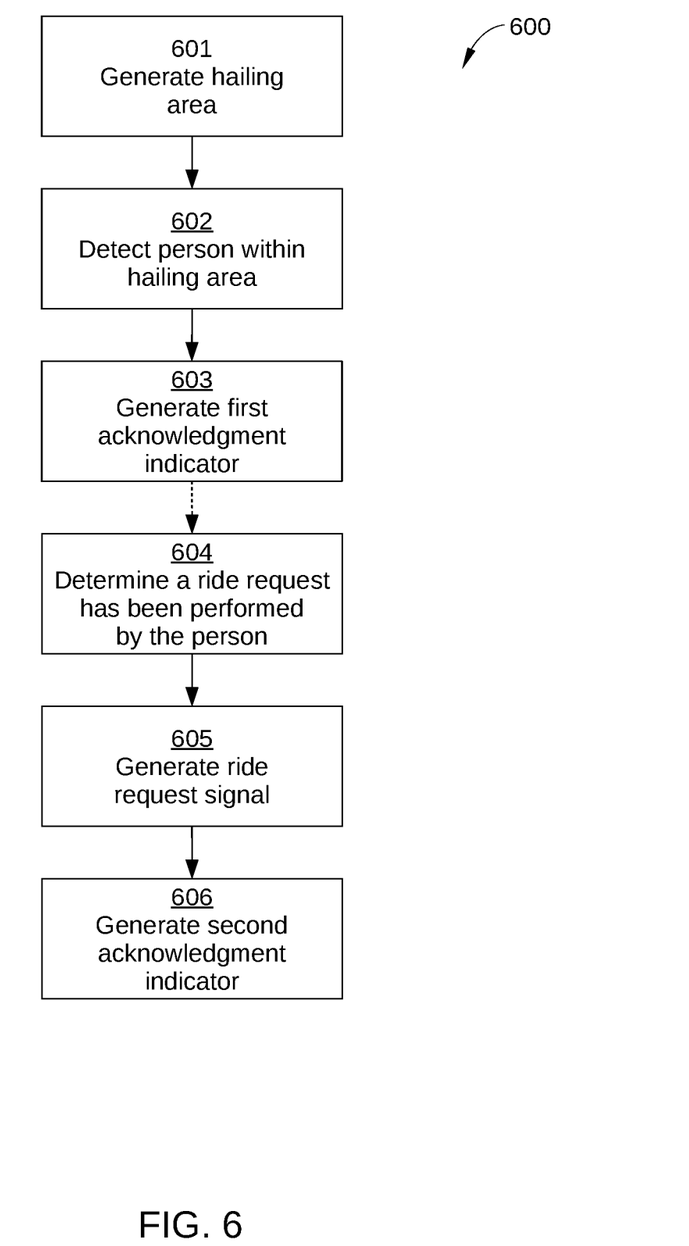
FIG. 6 is a flowchart of method steps for facilitating interaction with an autonomous vehicle, according to various embodiments of the present disclosure.

FIG. 6 is a flowchart of method steps for facilitating interaction with an autonomous vehicle, according to various embodiments of the present disclosure. Although the method steps are described with respect to the systems of FIGS. 1-5, persons skilled in the art will understand that any system configured to perform the method steps, in any order, falls within the scope of the various embodiments.

As shown, a method 600 begins at step 601, in which an AV interaction system, e.g., AV interaction system 100 or AV interaction system 500, generates a hailing area. In embodiments in which AV 101 includes visual projection system 140, visual projection system 140 directs light onto a suitable surface, such as a portion of sidewalk proximate AV 101, to generate hailing area 150. In such embodiments, the AV interaction system may generate hailing area 150 under specific circumstances, such as when AV 101 arrives at a specified location. In embodiments in which an AV interaction system includes fixed structure 510 with visual projection system 540, the AV interaction system may generate hailing area 550 continuously or when a person is detected to be in the vicinity of fixed structure 510.

In step 602, the AV interaction system detects a person within the hailing area. In some embodiments, a computing device 120 included in AV 101 detects rider 102 within hailing area 150, which is projected from AV 101. In such embodiments, computing device 120 makes such a determination based on image and/or other sensor data from sensors 130. In other embodiments, computing device 520 detects rider 502 within hailing area 550, which is disposed proximate fixed structure 510. In such embodiments, computing device 520 makes such a determination based on image and/or other sensor data from sensors 530.

In step 603, the AV interaction system generates a first acknowledgment indicator, such as an acknowledgment indicator that is visible and/or audible to rider 102 in hailing area 150 or rider 502 in hailing area 550. The AV interaction system generates the first acknowledgment indicator in response to detecting the person within the hailing area. Thus, the person is made aware that the AV interaction system is monitoring the hailing area to determine whether the person has performed a ride request.

In step 604, the AV interaction system determines that a ride request has been performed by the person in the hailing area. All persons outside the hailing area are ignored by the AV interaction system. Therefore, determining that a ride request has been performed is greatly simplified computationally, since the gestures and/or verbal utterances of only persons within the hailing area are analyzed. In embodiments in which AV interaction system is incorporated into AV 101, computing device 120 determines that the ride request has been performed based on image and/or audio data from sensors 130. Alternatively, in embodiments in which AV interaction system 500 is distributed between one or more AVs 501 and a fixed structure 510, computing device 520 determines that the ride request has been performed based on image and/or audio data from sensors 530.

In some embodiments, the AV interaction system receives additional ride request information, such as a rider request for a specific model or style of AV, an AV that can arrive in the shortest time, an AV that can provide a ride for the lowest fair, an AV belonging to a specific fleet of AVs, etc. For example, in some embodiments, the AV interaction system receives the additional ride request information via audible commands from the rider, from a mobile computing device associated with the rider, from a matrix barcode or other machine-readable optical label associated with the rider, etc.

In step 605, the AV interaction system generates a ride request signal in response to determining that the ride request has been performed in step 604. In embodiments in which AV interaction system is incorporated into AV 101, computing device 120 generates and transmits the ride request signal to AV control system 103, and AV 101 responds accordingly. For example, AV 101 safely approaches rider 102. Alternatively, in embodiments in which AV interaction system 500 is distributed between one or more AVs 501 and a fixed structure 510, computing device 520 transmits the ride request to the one or more AVs 501 directly or via ride-hailing administration entity 560. In either case, at least one AV 501 responds accordingly and navigates to fixed structure 510.

In step 606, the AV interaction system directs an output to the person in the hailing area. Thus, the potential rider can readily determine that the ride request has been received by the AV interaction system. For example, the AV interaction system causes a second acknowledgment indicator to be generated, such as a visible or audible acknowledgment that the ride request from the person in the hailing area has been received. In embodiments in which AV interaction system is incorporated into AV 101, computing device 120 causes the second acknowledgment indicator to be generated by acknowledgment output system 210. Alternatively, in embodiments in which AV interaction system 500 is distributed between one or more AVs 501 and a fixed structure 510, computing device 520 causes the second acknowledgment indicator to be generated by visual projection system 540, a loudspeaker associated with fixed structure 510, etc.

In sum, various embodiments set forth systems and techniques for interacting with an autonomous vehicle. In the embodiments, a specified hailing area is monitored for the presence of a person by suitable sensors and, when a person is detected within the hailing area, the sensors enable detection of the person performing a ride request. In addition, a visible and/or audible acknowledgment is directed to the person within the hailing area when the person is first detected within the hailing area and/or when the ride request is detected. The hailing area can be a predesignated area or generated by a projection system included in an autonomous vehicle.

At least one technological improvement of the disclosed embodiments is that a rider requesting service from an autonomous vehicle can readily discern at what location to wait for the autonomous vehicle in order to interact with the vehicle. Another advantage is that, when disposed at the location, the rider requesting the service can communicate directly with the autonomous vehicle easily, intuitively, and without specialized communication equipment, for example by a gesture or verbal utterance. A further advantage is that the rider can receive visual and/or audible acknowledgment from the autonomous vehicle when the vehicle has detected the rider and/or has received a communication from the rider.

1. In some embodiments, a system for interacting with an autonomous vehicle includes a sensor included in the autonomous vehicle and configured to generate sensor data corresponding to a projected hailing area; a projection system included in the autonomous vehicle and configured to generate the projected hailing area on a surface proximate the autonomous vehicle; and a processor included in the autonomous vehicle and configured to execute instructions to: analyze the sensor data to detect the person within the projected hailing area; and in response to detecting the person within the projected hailing area, cause an acknowledgment indicator to be outputted.

2. The system of clause 1, wherein the processor is further configured to execute instructions to cause the projection system to generate the projected hailing area on a surface proximate the autonomous vehicle.

3. The system of clauses 1 or 2, wherein the processor is further configured to execute instructions to cause the projection system to generate the projected hailing area on the surface proximate the autonomous vehicle in response to detecting that the autonomous vehicle is located in proximity to a specified location.

4. The system of any of clauses 1-3, wherein the processor is further configured to execute instructions to cause the projection system to generate the projected hailing area on a stationary portion of the surface while the autonomous vehicle is moving relative to the person.

5. The system of any of clauses 1-4, wherein the processor is further configured to execute instructions to, in response to receiving instructions to pick up a particular rider at the specified location, cause the autonomous vehicle to drive to the specified location.

6. The system of any of clauses 1-5, wherein the processor is further configured to execute instructions to determine that a ride request is performed by the person within the projected hailing area.

7. The system of any of clauses 1-6, wherein the ride request comprises a physical gesture performed by the person within the projected hailing area.

8. The system of any of clauses 1-7, wherein the processor is configured to execute the instructions to determine the ride request based on image data from the sensor.

9. The system of any of clauses 1-8, wherein the ride request comprises a verbal utterance by the person within the projected hailing area.

10. The system of any of clauses 1-9, wherein the processor is configured to execute the instructions to determine the ride request based on sound data from at least one microphone included in the sensor.

11. In some embodiments, a system for facilitating interactions with an autonomous vehicle includes: a sensor configured to generate sensor data corresponding to a hailing area; and a processor configured to execute instructions to: receive sensor input from the sensor; based on the sensor input, detect the person within the hailing area; and in response to detecting a person within the hailing area, generate a ride request signal that causes an autonomous vehicle to approach the hailing area; and cause an acknowledgment indicator to be outputted.

12. The system of clause 11, wherein the processor and the sensor are included in a fixed structure external to the autonomous vehicle.

13. The system of clauses 11 or 12, wherein detecting the person within the hailing area comprises determining that a ride request is performed by the person within the projected hailing area.

14. The system of any of clauses 1-13, wherein the ride request comprises one of a physical gesture performed by the person within the projected hailing area and a verbal utterance pronounced by the person within the projected hailing area.

15. The system of any of clauses 1-14, wherein generating the rider request signal comprises determining that the person within the hailing area has requested that the autonomous vehicle provide a ride to the person.

16. A method for facilitating interaction with an autonomous vehicle, the method comprising: projecting a hailing area on a surface proximate the autonomous vehicle detecting, via one or more sensors, a person disposed within the hailing area; determining that a ride request has been performed by the person; and generating a ride request signal that causes an autonomous vehicle to approach the hailing area and output an acknowledgement indicator to the person.

17. The method of clause 16, wherein generating the ride request signal comprises one of transmitting the ride request signal to the autonomous vehicle and transmitting the ride request signal to an administration entity that is external to the autonomous vehicle.

18. The method of clauses 16 or 17, further comprising, in response to detecting the person within the hailing area, adjusting the sensor to focus on the hailing area.

19. The system of any of clauses 16-18, wherein outputting the acknowledgment indicator to the person comprises at least one of generating an acknowledgment indicator that is visible to the person within the hailing area, generating an acknowledgment indicator that is audible to the person within the hailing area, and generating an acknowledgment indicator that can be felt by the person within the hailing area.

20. The system of any of clauses 16-19, wherein generating the acknowledgment indicator that is visible to the person within the hailing area comprises modifying a visual feature of the hailing area.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for facilitating interaction with an autonomous vehicle, the system comprising:
    a sensor included in the autonomous vehicle and configured to generate sensor data corresponding to a projected hailing area;
    an image projection system included in the autonomous vehicle and configured to generate the projected hailing area on a stationary portion of a surface proximate the autonomous vehicle while the autonomous vehicle is moving relative to a person; and
    a processor included in the autonomous vehicle and configured to execute instructions to:
        analyze the sensor data to detect the person within the projected hailing area; and
        in response to detecting the person within the projected hailing area, cause an acknowledgment indicator to be outputted to the person.

2. The system of claim 1, wherein the processor is further configured to execute instructions to cause the image projection system to generate the projected hailing area on the surface proximate the autonomous vehicle in response to detecting that the autonomous vehicle is located in proximity to a specified location.

3. The system of claim 2, wherein the processor is further configured to execute instructions to, in response to receiving instructions to pick up a particular rider at the specified location, cause the autonomous vehicle to drive to the specified location.

4. The system of claim 1, wherein the processor is further configured to execute instructions to determine that a ride request is performed by the person within the projected hailing area.

5. The system of claim 4, wherein the ride request comprises a physical gesture performed by the person within the projected hailing area.

6. The system of claim 5, wherein the processor is configured to execute the instructions to determine the ride request based on image data from the sensor.

7. The system of claim 4, wherein the ride request comprises a verbal utterance by the person within the projected hailing area.

8. The system of claim 7, wherein the processor is configured to execute the instructions to determine the ride request based on sound data from at least one microphone included in the sensor.

9. A system for facilitating interactions with an autonomous vehicle, the system comprising:
    a sensor configured to generate sensor data corresponding to a hailing area; and
    a processor configured to execute instructions to:
        receive sensor input from the sensor;
        based on the sensor input, detect a person within the hailing area;
        in response to detecting the person within the hailing area, generate a ride request signal that causes the autonomous vehicle to approach the hailing area and cause an acknowledgment indicator to be outputted; and
        cause an image projection system to project the hailing area on a stationary portion of a surface proximate to the autonomous vehicle while the autonomous vehicle is moving relative to the person.

10. The system of claim 9, wherein the processor and the sensor are included in a fixed structure external to the autonomous vehicle.

11. The system of claim 10, wherein detecting the person within the hailing area comprises determining that a ride request is performed by the person within the hailing area.

12. The system of claim 11, wherein the ride request comprises one of a physical gesture performed by the person within the hailing area and a verbal utterance pronounced by the person within the hailing area.

13. The system of claim 9, wherein generating the ride request signal comprises determining that the person within the hailing area has requested that the autonomous vehicle provide a ride to the person.

14. A method for facilitating interaction with an autonomous vehicle, the method comprising:
    projecting a hailing area on a stationary portion of a surface proximate the autonomous vehicle while the autonomous vehicle is moving relative to a person;

detecting, via one or more sensors, the person disposed within the hailing area;

determining that a ride request has been performed by the person; and generating a ride request signal that causes the autonomous vehicle to approach the hailing area and output an acknowledgement indicator to the person.

15. The method of claim 14, wherein generating the ride request signal comprises one of transmitting the ride request signal to the autonomous vehicle and transmitting the ride request signal to an administration entity that is external to the autonomous vehicle.

16. The method of claim 14, further comprising, in response to detecting the person within the hailing area, adjusting the one or more sensors to focus on the hailing area.

17. The method of claim 14, wherein outputting the acknowledgment indicator to the person comprises at least one of generating an acknowledgment indicator that is visible to the person within the hailing area, generating an acknowledgment indicator that is audible to the person within the hailing area, and generating an acknowledgment indicator that can be felt by the person within the hailing area.

18. The method of claim 17, wherein generating the acknowledgment indicator that is visible to the person within the hailing area comprises modifying a visual feature of the hailing area.

* * * * *